R. C. G. NEUMANN & S. D. DUNHAM.
BALING PRESS.
APPLICATION FILED MAR. 11, 1908.

909,648.

Patented Jan. 12, 1909.

Witnesses
E. W. Cressman
Arleta Adams

Inventors
R. C. G. Neumann
S. D. Dunham
By Adams & Brooks
Attorneys

THE NORRIS PETERS CO., WASHINGTON, D. C.

UNITED STATES PATENT OFFICE.

RICHARD C. G. NEUMANN AND SPENCER D. DUNHAM, OF SEATTLE, WASHINGTON.

BALING-PRESS.

No. 909,648.　　　　Specification of Letters Patent.　　　Patented Jan. 12, 1909.

Application filed March 11, 1908. Serial No. 420,511.

*To all whom it may concern:*

Be it known that we, RICHARD C. G. NEUMANN and SPENCER D. DUNHAM, citizens of the United States of America, and residents of the city of Seattle, in the county of King and State of Washington, have invented certain new and useful Improvements in Baling-Presses, of which the following is a specification.

Our invention aims primarily to provide a comparatively simple mechanism which will operate in an efficient manner. With this and other objects in view, to be referred to as the description progresses, our invention resides in the structural features, arrangement and combinations of parts, hereinafter described and succinctly defined in the claims hereto annexed.

Figure 3:
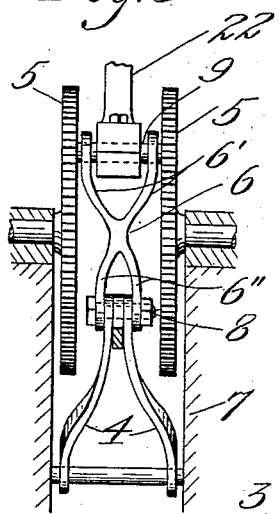
Figure 1:
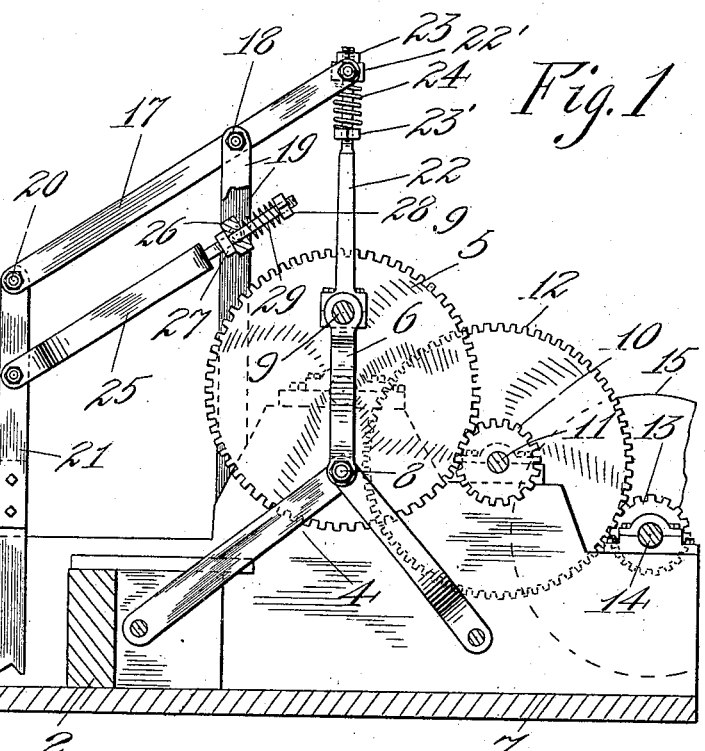
Figure 2:
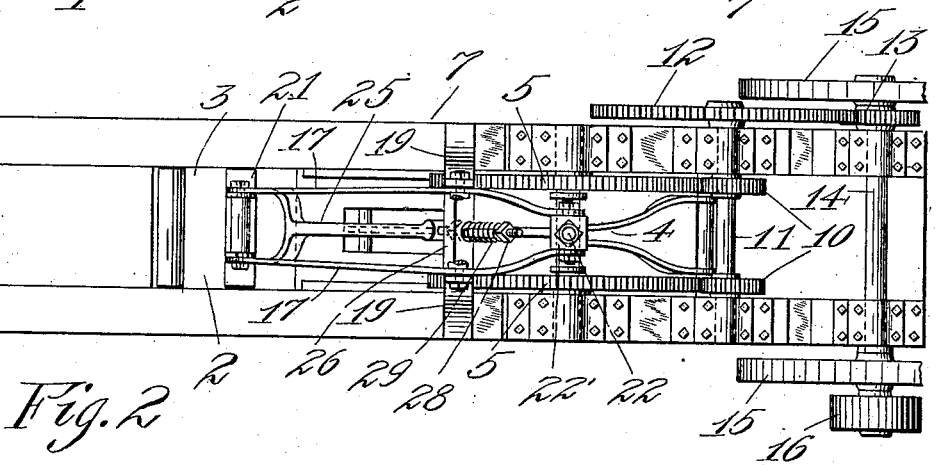

Referring now, to the accompanying drawing, in which like numerals of reference indicate like parts throughout the several views Figure 1 is a fragmentary view in longitudinal section of a press embodying our invention. Fig. 2 is a top plan view, and Fig. 3 is a transverse sectional view illustrating more particularly the connection between the driven gears, the feed lever and the toggle joint.

Referring now to the drawing by numerals of reference, 1 indicates the press box of the baling press in which the material is compressed by a suitable plunger 2, said press box being provided in its top wall with a suitable feed opening, as 3.

Plunger 2 is given a reciprocatory movement through the medium of a toggle 4, to which power is transmitted from driven gears 5, by a pitman 6.

The members of toggle 4 are pivoted, one to plunger 2 and the other to the frame 7, and at their contiguous ends are connected by a pin 8.

Pitman 6 is provided at its upper and lower end portions with spaced arms arranged in pairs, as 6', 6" (see Fig. 3) the lower pair of which receive the joint of toggle 4 and have pivotal connection with the pin 8 thereof.

The upper arms of pitman 6 are mounted on a pin 9, extending between and fixed eccentrically to said driven gears 5.

Gears 5 are driven by pinions 10, fixed to a shaft 11, on which is also fixed a large gear 12 which meshes with and is driven by a pinion 13 on drive shaft 14.

Drive shaft 14 is preferably provided with suitable fly wheels 15 and a pulley 16, to the latter of which power may be applied, as by a belt (not shown).

Reference numeral 17 indicates a feed lever which preferably comprises a pair of spaced bars, as shown. This feed lever is pivotally supported at 18 between a pair of standards 19, and has pivoted on its forward end, as by a pin 20, a depending feeder head 21.

Reference numeral 22 indicates a connecting rod engaged with pin 9 and with a block 22' pivoted in the rear end portion of the feed lever, whereby upon rotation of gears 5, said lever will be oscillated to elevate and lower feeder head 21 through the feed opening 3 of the press box.

As now considered, the connection between rod 22 and lever 17 is of a yielding nature, said rod having its upper portion slidably received in said block 22' and provided with nuts 23, 23' between the latter of which and the under side of said block, a spring 24 is arranged. By this construction, injury to the machinery, as by the movement of head 21 being restricted or retarded by too great a quantity of material being caught under said head, will be prevented.

A connecting rod 25, pivoted at one end to head 21 and having its other end slidably supported in a cross bar 26 fixed to standards 19, is provided with a stop 27 which prevents rearward swinging of head 21. Connecting rod 25 is provided with another stop, as 28, which is spaced from the rear side of cross bar 26 so as to allow a limited movement of said head in a forward direction, said head is however, yieldingly held in and returned to its normal position by a spring 29. This construction is provided to prevent injury of the feeder head, which is not entirely withdrawn from the chamber of the press box when the plunger begins its forward stroke.

Having thus described our invention, what we claim as new and desire to secure by Letters Patent of the United States of America, is:

1. In a baling press, in combination with the press box formed with a feed opening, a lever supported for oscillation, a feeder head supported on one end of said lever for movement through the opening in said press box, a block pivotally supported in the other end of said lever, a driven means supported for rotation, a connecting rod connected at one end to said driven means and having its other end portion slidably supported in said block, stops on said connecting rod disposed above and below said block, and a resilient means arranged between one of said stops and said block.

2. In a baling press, in combination with the press box formed with a feed opening, and the plunger mounted for reciprocation, a feeder head supported for vertical movement through the feed opening in said press box and for swinging longitudinally of said press box whereby it is free to be moved by the hay being baled away from said plunger during its inward stroke, means for raising and lowering said feeder head, and yielding means tending to hold said feeder head from swinging.

3. In a baling press, in combination with the press box formed with a feed opening, a lever supported for oscillation, a feeder head pivotally connected to one end of said lever for vertical swinging, means yieldingly holding said feeder head against swinging on said lever, a driven means supported for rotation, and a connecting means between the other end of said lever and said driven means.

4. In a baling press, in combination with the press box formed with a feed opening, a pair of standards, a lever fulcrumed on said standards, a feeder head pivotally connected to one end of said lever, a driven means supported for rotation, means connecting the other end of said lever to said driven means, a rod pivotally connected to said feeder head, said rods being slidably supported on said standards, and means yieldingly holding said rod against sliding, for the purpose specified.

Signed at Seattle, Washington this 29th day of February 1908.

RICHARD C. G. NEUMANN.
SPENCER D. DUNHAM.

Witnesses:
Louis Ludwig,
R. Damus.